United States Patent [19]

Kumm

[11] 4,151,721

[45] May 1, 1979

[54] SOLAR POWERED AIR CONDITIONING SYSTEM EMPLOYING HYDROXIDE WATER SOLUTION

[76] Inventor: Emerson L. Kumm, 1035 E. Laguna Dr., Tempe, Ariz. 85282

[21] Appl. No.: 831,812

[22] Filed: Sep. 9, 1977

[51] Int. Cl.$^2$ .................. F25B 27/00; F25B 15/00; F25B 37/00; F25B 29/00
[52] U.S. Cl. ............................................. 62/2; 62/112; 62/494; 165/48 S; 237/1 A
[58] Field of Search ................ 62/2, 112, 494; 237/1 A; 261/18 R, 18 B, 108, 140 A

[56] References Cited

U.S. PATENT DOCUMENTS

| | | | |
|---|---|---|---|
| 1,961,297 | 6/1934 | Katzow | 62/494 |
| 2,210,496 | 8/1940 | Peltier | 62/494 |
| 2,795,115 | 6/1957 | Kumm | 62/112 |
| 3,276,217 | 10/1966 | Bourne et al. | 62/112 |
| 3,894,528 | 7/1975 | Stubblefield | 62/2 |
| 4,007,776 | 2/1977 | Alkasab | 62/2 |
| 4,070,870 | 1/1978 | Bahel et al. | 62/2 |

FOREIGN PATENT DOCUMENTS 522478  4/1975  U.S.S.R. ................................. 62/2

Primary Examiner—John J. Vrablik
Attorney, Agent, or Firm—Herschel C. Omohundro

[57] ABSTRACT

Primarily this system includes an air inducting, circulating, and exhausting section and a pair of solar responsive fluid treating sections, one of the latter being provided to cool the air and the other to heat the air. Both solar responsive fluid treating sections, however, function in concert for cooling and heating.

The air inducting, circulating and exhausting section has duct portions through which air is drawn from the atmosphere by a fan and either used as admitted or heated or cooled, then directed into the enclosure being served, all or part of the air being recirculated, the part not recirculated being discharged to the atmosphere. The duct portions contain air heating and air and other solution cooling devices as well as fans and guide or flow controlling vanes. One solar responsive fluid treating section has an absorptive chemical solution reservoir, a solution cooler, a solar heated solution concentrator, heat and vapor exchangers, pumps, valves, and connecting lines. The other solar responsive fluid treating section has a fluid heat transfer solution storage tank, a solar heat collector, heat exchangers, pumps, valves and connecting lines. The latter section is a substantially conventional solar heating system coupled in a unique manner with the first solar responsive section to cooperate therewith in both the heating and refrigerating modes of operation of the subject system.

28 Claims, 5 Drawing Figures

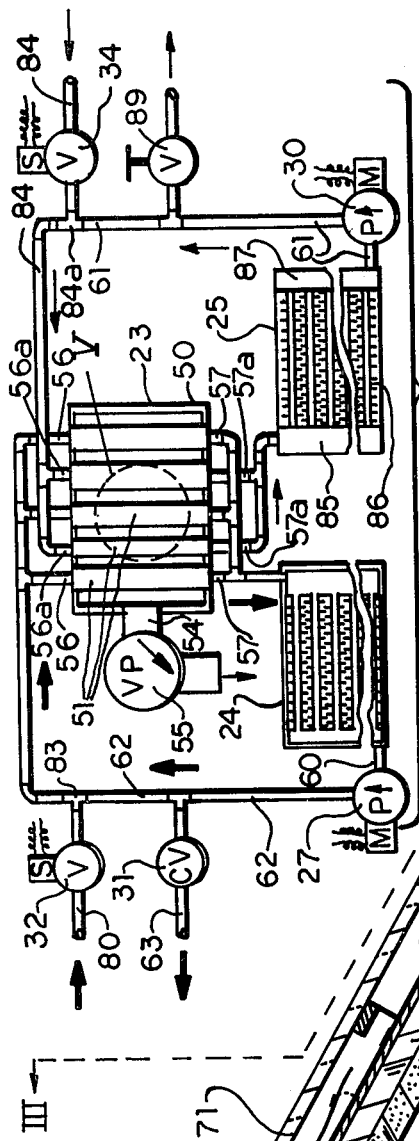

SOLAR POWERED AIR CONDITIONING SYSTEM EMPLOYING HYDROXIDE WATER SOLUTION

BACKGROUND OF THE INVENTION

This invention relates generally to air conditioning systems and more particularly to systems utilizing solar energy and especially designed for use in environments characterized by high ambient temperatures and low relative humidities.

The invention relates still more particularly to solar powered systems utilizing evaporation-absorbtion principles and falling generally in the class exemplified in part by the following patents:

| | |
|---|---|
| # 1,477,127 to Kasley | # 2,257,462 to Gildersleeve et al |
| # 1,924,914 to Comstock | # 2,297,761 to Hainsworth |
| # 2,182,453 to Sellew | # 2,469,142 to Anderson |
| # 2,200,118 to Miller | # 2,795,115 to Kumm |

More recent publications relating specifically to the subject of this invention include the following references:

Baum, V. A., et al, "Utilization of Solar Energy for Air Conditioning for Regions Characterized by Hot and Dry Climates", ISES Annual Conference, Paris, 1973 (in French). Swartman, R. K.; Ha, V.; and Newton, A. J., "Survey of Solar-Powered Refrigeration:, ASME 73-WA/Sol-6."

Such patents and publications are directed to refrigeration systems using some of the features of the subject system but none shows the unique combinations of steps and structure of the latter and none accomplishes the objectives thereof, such as, reduced size, high efficiency, economy of manufacture and operation.

SUMMARY OF THE DISCLOSURE

One of the objects of this invention is to provide a method of cooling an enclosure using a basic hydroxide water solution in a series of unique steps embodying principles not heretofore practiced for similar purposes.

An object of the invention also is to provide an air conditioning system having apparatus which is in some respects conventional but is arranged and connected in a novel manner to make use of the new method mentioned in the preceding paragraph. A further object of the invention is to provide an air conditioning system having apparatus in which a basic hydroxide solution is placed in a vapor exchange relationship with water in a region of reduced pressure whereby some of the water will be vaporized and then absorbed by the basic hydroxide solution, said solution and the unvaporized water then being removed and subjected to further treatment such as cooling and recirculation of the hydroxide solution and the passing of the water through heat exchange relationship with air to refrigerate the air, the latter being employed to cool an enclosure.

A still further object of the invention is to provide an air conditioning system having an unique arrangement of heat exchangers, storage tanks or reservoirs, a back up heater, solar heat collectors, and solution concentrating means, pumps, and valve means, the system being used in both heating and refrigerating modes, the arrangement permitting significantly lower overall equipment size and cost when compared to hithertoknown solar powered absorption refrigeration systems, such as those using lithium bromide or ammonia-water solutions.

Another object is to provide an air conditioning system using water vapor absorption by a solution of one or more of the soluble basic hydroxides, such as sodium hydroxide or potassium hydroxide, which is subsequently reconcentrated by evaporating the water to the ambient air using solar heating of the basic hydroxide solution to provide refrigeration over a wider ambient range of conditions than is possible with other deliquescent materials. An advantage of such system is the significant reduction of the electrical energy requirements over that of the conventional heat pump and refrigerating system using mechanical vapor compressors.

Further objects and advantages of the invention will be set forth or made obvious by the following description of the system selected for illustration in the accompanying drawings.

IN THE DRAWINGS

FIG. 2 is a longitudinal sectional view of a solar heated solution concentrator used in the system shown in FIG. 1;

FIG. 3 is a front elevational view of the concentrator shown in FIG. 2, the view being taken on the line III—III of FIG. 2;

FIG. 4 is schematic view of apparatus used in the system shown in FIG. 1, the apparatus including a vapor exchanger, a solution cooler, and a heat exchanger which functions as an air cooling unit, pumps, valves, and lines which connect the elements being indicated; and FIG. 5 is an enlarged sectional view of a portion of the vapor exchanger, such portion being identified by the circle V of FIG. 4.

DESCRIPTION

Figure 1:
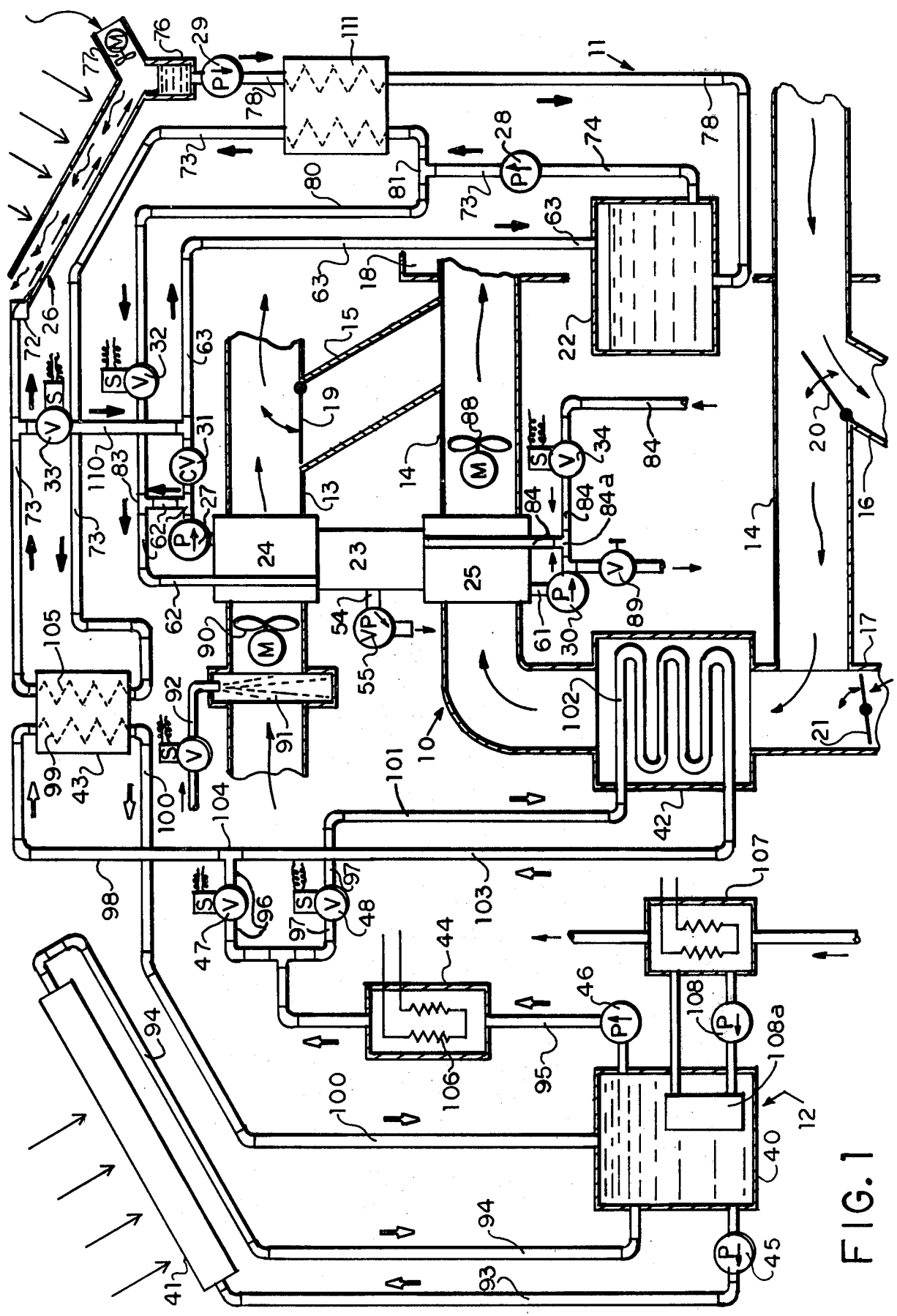
FIG. 1 is a combination schematic view of some of the equipment and a flow diagram of a system embodying the principles of the present invention.

Referring more particularly to the drawings and especially FIG. 1, it will be observed that three main sections 10, 11 and 12 make up the system. Section 10 is composed of an arrangement of air duct portions 13, 14, 15, 16 and 17, which admit air from the atmosphere, conduct it to the enclosure 18 being served, recirculate the air, and discharge variable amounts to the atmosphere. Many duct arrangements may be suitable but the one illustrated has the duct portion 13 communicating with the atmosphere at both ends. Duct portion 14 communicates at both ends with the enclosure 18 being air conditioned. Portion 15 establishes communication between duct portions 13 and 14, such commucation being controlled by a guide vane 19. Duct portion 16 leads from portion 14 to the atmosphere; flow through portion 16 is controlled by vane 20. Duct portion 17 establishes communication between portion 14 and the atmosphere, the extent of such communication being governed by a damper-like vane 21 for the purpose of modifying air from the enclosure being recirculated or for replenishing air exhausted through duct portion 16. Section 10, or certain of the duct portions composing it, contain various parts of the apparatus which will be identified, described, and their purposes set forth hereinafter.

Section 11 of the system constitutes one of the solar responsive fluid treating sections, being, in this instance, the section wherein the soluble basic hydroxide is employed. Referring to FIG. 1, section 11 is composed of a basic hydroxide solution reservoir 22, a vapor exchanger 23, a hydroxide solution cooler 24, a heat exchanger 25, a solar powered hydroxide solution concentrator 26, solution pumps 27, 28, and 29, a water pump 30, a plurality of valves 31, 32, 33, 34, and connecting lines.

Section 12 of the system is another solar responsive fluid treating section which in this disclosure is a substantially conventional solar energy heating system using a fluid heat transfer media. Again referring to FIG. 1, it will be seen that section 12 includes a storage tank 40, a solar powered heat collector 41, a heat exchanger 42, a hydroxide solution/fluid heat transfer media exchanger 43, a backup heater 44, pumps 45, 46, valves 47, 48 and connecting lines.

From FIG. 1 it will be observed that element 24 of section 11 is arranged in duct portion 13, while element 25 of such section is disposed in duct portion 14. The latter duct portion also contains element 42 of section 11. The purpose of these arrangements will be set forth as the description proceeds. Element 23 of section 11 is disposed adjacent elements 24 and 25 and preferably outside of the duct portions.

It may be well at this time to refer to FIGS. 4 and 5 wherein certain pieces of the apparatus, i.e. vapor exchanger 23, hydroxide cooler 24, and heat exchanger 25 are disclosed in detail. Vapor exchanger 23 comprises a casing 50 containing a plurality of vertical columns 51, each made up of a multiplicity of vertically spaced, slightly inclined trays 52 and 52a. Each tray has an upwardly projecting flange 53, along its upper edge and alternate trays are oppositely inclined, the lower edges of the trays terminating in a closely spaced arrangement to the next lower tray. This geometry permits fluid supplied to the upper end of the columns to descend in shallow repeatedly reversing streams to increase or amplify the liquid absorbing or evaporating areas. One wall of the casing 50 has an opening 54 leading to a pump 55, the operation of which reduces the pressure in the casing around the columns 51. At their upper and lower ends, respectively, the columns communicate with inlet and outlet tubes 56, 56a and 57, 57a. Inlet tubes 56 supply fluid to one set of columns while inlet tubes 56a supply another fluid to the other set of columns, these columns are alternately arranged for a reason to be set forth hereinafter. Outlet tubes 57 communicate with one another while tubes 57a communicate. Tubes 57 lead to the hydroxide solution cooler 24 and tubes 57a lead to heat exchanger 25.

Elements 24 and 25 are similar in that each has headers at opposite ends with finned tubes connecting the headers. Fluid admitted to the headers at one end flows through the tubes and absorbs or dissipates heat via the metal tubes and fins from or to the air surrounding elements.

In the operation of the system, tubes 56 are supplied with the selected basic hydroxide solution and tubes 56a are supplied with water. These fluids will flow into the vapor exchanger 23, the basic hydroxide solution and water flowing down alternate columns over the spaced trays. A comparatively large amount of water at a comparatively low overall pressure drop will pass from the water flow on the trays 52a to the basic hydroxide solution flow on the trays 52 by vaporization of the water and its subsequent absorption in the basic hydroxide solution. The quantity of water that is vaporized as mentioned above is comparatively large for the size of vapor exchanger 23 as employed and the overall pressure drop is comparatively low, due to amplification of liquid surface areas obtained by the geometry of the trays 52, 52a and their arrangement in closely spaced columns 51, which gives a very low operating vapor flow pressure drop. As a consequence the hydroxide solution will be heated by absorbing the water vapor. Such solution will flow from the columns into tubes 57 and empty into the hydroxide solution cooler 24. Water which has not been vaporized flows from the respective columns into tubes 57a and discharges into the heat exchanger 25. Since this unvaporized water has been cooled by the vaporization occurring in element 23 it will be at a low temperature and as it flows through heat exchanger 25 it will absorb heat from air flowing past exchanger 25 in duct 14. This cooled air exits from duct 14 into enclosure 18 to cool said enclosure 18.

From FIG. 4 it will be apparent that elements 24 and 25 have fluid outlets 60 and 61, respectively, outlet 60 communicating with pump 27 and outlet 61 communicating with pump 30. Pump 27 withdraws the basic hydroxide solution from cooler 24 and directs at least part of it through line 62 to tubes 56 for recirculation through the vapor exchanger 23. Line 62 connects, through a check valve 31, with a branch line 63 leading to the reservoir 22 for the hydroxide solution. The portion of the solution flowing from the cooler 24 through line 63 will be somewhat diluted due to the absorption of water vapor in the exchanger 23. In reservoir 22 it will be mixed with other basic hydroxide solution which has been concentrated in another part of the section 11 about to be described.

The latter part of the section 11 includes the solar powered solution concentrator 26 through which the solution is passed for a treatment consisting of exposure to solar radiation to vaporize the water and exposure to atmospheric air flow to absorb and carry away the water vapor. The concentrator 26 is shown in detail in FIGS. 2 and 3; it is sometime referred to in the trade as a trickle down collector. It comprises a body 65 with a corrosion resistant sheet 66, backed typically by a layer 67 of fiberglass insulation and another layer 68 of an insulating semi-rigid urethane foam. Layers 67 and 68 effectively insulate the sheet 66. The body 65 is supported, in an inclined position, on a suitable support 69 by brackets 70, the orientation of concentrator 26 being arranged to secure the most heat from the sun rays. A transparent sheet 71 is supported over and spaced from the sheet 66. At the upper end of the sheet 66 there is provided a trough-like flow distributor 72 to which a line 73 is connected. This line leads from a pump 28 connected by a line 74 with the basic hydroxide solution reservoir 22. Operation of pump 28 draws the solution from the reservoir and delivers it via line 73 to the trough 72. The trough has a slot 75 at one side through which the solution will flow onto the sheet 66. The quantity of the solution supplied to the trough will be sufficient to cause a relatively thin liquid film to flow downwardly by gravity over the sheet 66, covering the entire surface of sheet 66. The sunrays passing through the transparent sheet 71 will heat the solution causing a part of the water to vaporize. The water vapor rising from the film of solution passing down the sheet 66 is absorbed in a flow of air at substantially atmospheric pressure passing counter to the solution, the air flow being provided by a motor driven fan 77 having its outlet communicating with the space between the sheets 66 and 71. This space is open to the atmosphere at the upper end of the concentrator 26 for the discharge of the air containing said vaporized water. The removal of the water in this manner concentrates the basic hydroxide solution. A second trough 76 at the lower end of the body 65 collects the concentrated solution.

Trough 76 is connected by a line 78 through which the now concentrated hydroxide solution flows to the reservoir 22. This line may be provided with a pump 29 to assist the flow of solution to the reservoir. Concentrated hydroxide solution from reservoir 22 is supplied to the vapor exchanger through a line 80 branching from line 73 at 81. Line 80 contains a suitably operated valve 32. Line 80 connects with line 62, at 83, line 62 leading, as described above, to the vapor exchanger 23. When pump 28 is operating and valve 32 is opened, concentrated basic hydroxide solution from reservoir 22 will be mixed with the dilute solution from cooler 24 being recirculated by pump 27. The increased pressure on the solution being recirculated by pump 27 when valve 32 is opened will cause a portion of the dilute solution to pass through check valve 31 and line 63 to reservoir 22.

Section 11 of the system is supplied with water from a suitable source through a line 84 which leads to water inlets 56a of the vapor exchanger 23. Line 84 contains a solenoid or other suitably actuated valve 34 which may be employed to control the admission of water to the system. As previously pointed out, water admitted flows to the respective columns 51 and down the series of trays 52a in the reduced pressure within the vapor exchanger 23. The basic hydroxide solution equilibrium water vapor pressure being less than the water vapor pressure over the water flow, some of the water evaporates and is absorbed in the hydroxide solution as previously described. This arrangement provides an efficient exchange and consequent reduction in temperature of the unvaporized portion of the water. Such portion flows from the vapor exchanger 23 via outlet tubes 57a and passes into the header 85 at one end of heat exchanger 25. As previously described, the exchanger 25 has finned tubes 86 connecting header 85 with a second header 87 at the opposite end. Water received by header 85 flows through tubes 86 and extracts heat from air engaging the fins on the tubes. Since the heat exchanger is disposed in duct portion 14, air flowing through the duct will be cooled and passed, under the influence of a motor driven fan 88, into the enclosure 18 to cool the atmosphere therein. Air from the enclosure may be recirculated through the duct portion 14 to effect additional temperature reduction. Removal of some of the air and replacement of the air removed may be effected through the selective adjustment of vane 20 and damper 21.

Water collected in header 87 is drawn from the heat exchanger 25 through pipe 61 by a motor driven pump 30 and added to water having low total dissolved solids in line 84 as at 84a. As the quantity of dissolved solids of any character accumulates in the water due to the vaporization occurring in vapor exchanger 23, some of the water is exhausted through valved outlet 89, leading from pipe 61 to a suitable drain, to prevent accumulating an excessive solid content in said water.

It will be noted from FIG. 1 that element 24 is disposed in duct portion 13 and received the basic hydroxide solution flowing from the vapor exchanger after absorption of the water vapor. Since such absorption raises the temperature of the solution, air is drawn into duct portion 13 from the atmosphere and forced past the vaned tubes of cooler 24 by fan 90 to remove heat from the solution. This air is normally exhausted from duct 13 back to the atmosphere. Air drawn into duct 13 is passed through an evaporator 91 to which water is supplied via a valved pipe 92. Air flowing from evaporator 91 is thereby cooled and humidified to increase its effectivity in cooling the basic hydroxide solution passing through element 24, when the system is used for refrigeration of the enclosure 18.

It has previously been pointed out that section 12 of the system is a substantially conventional solar responsive fluid treating section having a liquid storage tank 40, a solar powered heat collector 41, a heat exchanger 42, a hydroxide solution/heat transfer media heat exchanger 43, a backup heater 44, pumps 45 and 46, valves 47 and 48, and connecting lines. This section of the system is, in general, closed and contains primarily a glycol/water or other heat transfer fluid media. In general, the system is filled with a heat transfer fluid media which is drawn from reservoir 40 by pump 45 and directed through line 93 to the solar heat collector 41. In the latter element the sun's rays will heat the fluid media which then returns through line 94 to the storage tank 40. Some of the heated fluid may be drawn from tank 40 by pump 46 and directed through line 95, containing backup heater 44, to branch lines 96 and 97 which contain valves 47 and 48. Branch 96 connects with line 98 which leads to a heat transfer element 99 in the hydroxide solution/fluid heat transfer media heat exchanger 43. Line 100 leads from element 99 back to the storage tank 40. Branch line 97 connects with line 101 which leads to an element 102 in heat exchanger 42, line 103 leading from element 102 and communicating with line 98 at 104. It will be seen from FIG. 1, in the light of the above description, that when pump 46 is in operation and valve 47 is open the heat transfer fluid media will be drawn from the storage tank, pressed through back-up heater 44, branch 96 and line 98 to element 99, in heat exchanger 43 and back to the storage tank 40. If valve 47 is closed and valve 48 is open, when pump 46 is in operation, the heat transfer fluid media drawn from tank 40 will flow via line 95, backup heater 44, branch 97, and line 101 to element 102 in heat exchanger 42; from element 102 the heat transfer media will flow via line 103 and 98 to element 99 and thence via line 100 to tank 40.

From the foregoing it will be obvious that the solar responsive fluid treating section 12 functions to collect solar heat in the heat transfer media and store it in tank 40, for subsequent use in heat exchanger 43 when cooling enclosure 18 and also for use in heat exchanger 42 when heating enclosure 18. In addition to element 99, heat exchanger 43 contains a second heat exchanger element 105, which forms a part of line 73 of the hydroxide fluid treating section 11 and exposes the basic hydroxide solution flowing through such line to heat exchange relation with the solar heated heat transfer media flowing through element 99. In this manner the basic hydroxide solution flowing to the concentrator 26 may be pre-heated. The unit 26 will thus be made more efficient and as a result may be decreased in size from what would otherwise be required.

During extended periods when sunrays are not available to heat the solutions, emergency use may be made of the backup heater 44. The element contains typically an electric resistance coil 106 to heat the fluid media flowing to heat exchanger 43. Additional heat can also be secured indirectly through another heater 107 supplied to heat water for general purposes, when insufficient solar heat is obtainable. Some of this water is passed through heat exchange relation with the heat transfer fluid media in tank 40 disposed within tank 40 and through heat exchange relation with the general purpose hot water from heater 107. When solar heat is available and operation of pump 45 has resulted in heating the fluid media in reservoir 40 to a sufficiently high temperature, operation of pump 108 on a separate water circulation system permits transferring the solar heat stored in said fluid media in reservoir 40 to the general purpose water passing through the heater 107, thus obtaining hot general purpose water without the operation of electrical heating in the heater 107.

At times when refrigeration is not required but heat is desirable, valve 47 is closed and valve 48 opened. At such time the heated fluid media from tank 40 will then be circulated through element 102 in heat exchanger 42 and air flowing through duct section 14 will be heated. The fluid heat transfer media flowing from heat exchanger 42 will then pass through heat exchanger 43 and may extract heat from the basic hydroxide solution flowing through element 105. During the heating mode of operation of the system the concentrator 26 may be used only as a solar heat collector by not operating the air fan 77, allowing the basic hydroxide solution to absorb heat from the sun's rays without being further concentrated by vaporization of water and pass to the reservoir 22. Also, during such an operating mode when solar heat is inadequate or not available, the basic hydroxide solution may be caused to by pass the concentrator through the opening of a valve 33 arranged in a by-pass 110 leading from line 73 to line 63.

The refrigerating action of section 11 is discontinued during the heating operational mode by closing valve 32 and opening valve 33, which directs substantially all of the basic hydroxide solution delivered by pump 28 through heat exchanger 43 and back via lines 73, 110 and 63 to the reservoir 22. When sufficient solar heating exists to increase the temperature of the basic hydroxide solution by allowing it to flow through the solar heat collector 26, the valve 33 is closed and the basic hydroxide solution is forced to flow through the solar heat collector 26 as previously described but without the operation of fan 77. The basic hydroxide solution may be assisted in its removal from trough 76 by pump 29 and passed through heat exchanger 111, having counter flow heat exchange means with the basic hydroxide solution discharged from pump 28, and is then transmitted back to reservoir 22 via line 78. The heat exchanger 111 gives an additional preheating of the basic hydroxide solution passing via line 73 to heat exchanger 43 when solar heating is available, in order to obtain greater efficiency in heating the fluid heat transfer media passing from the heat exchanger 42 via line 103, line 98, element 99, and line 100 back to the heat storage reservoir 40.

The cooling mode of operation of the system may be summarized as follows: Starting with the concentrated basic hydroxide solution in reservoir 22, pump 28 will draw the basic hydroxide solution from the reservoir and direct it through lines 80 and 62 to the vapor exchanger 23. The hydroxide solution and water pass simultaneously downward through the successive trays in the columns 51 of the vapor exchanger 23, the interior of which is maintained at a reduced pressure, which corresponds approximately to the equilibrium water vapor pressure at the water operating temperature desired for refrigeration purposes in heat exchange means 25 with an air flow. As previously described, the vaporization of water cools the water flow and the absorption of the resulting water vapor heats the basic hydroxide solution flow. Thus, the basic hydroxide solution increases in temperature while the temperature of the water flow decreases. The basic hydroxide solution flows from the vapor exchanger into the solution cooler 24; the unvaporized water flows into the heat exchanger 25. Air passing through heat exchanger 25 is refrigerated for use in cooling the enclosure 18. Some of the basic hydroxide solution flowing from cooler 24 is recycled through the vapor exchanger and some is returned to the reservoir 22. The basic hydroxide solution is concentrated by pumping some of the solution to the concentrator 26 wherein solar heat is employed to vaporize water from the basic hydroxide solution and dissipate the vapor into the atmosphere by passing air from a fan over the solution as the solar heat is applied. The concentrated hydroxide solution is returned to reservoir 22 for readmission to the vapor exchanger.

The efficiency of the system is increased by adding the previously described solar heat collecting branch to the system and utilizing heated fluid from there to preheat the hydroxide solution prior to introducing it into the solar heated solution concentrator 26. The solar heat collecting branch has a fluid heat transfer media storage tank 40 from which said fluid is pumped to the solar heat collector 41. Said solar heated fluid media is returned to the tank for storage. Said solar heated fluid media is passed from the tank 40 through heat exchange relationship with the basic hydroxide solution in heat exchanger 43 before the basic hydroxide solution is introduced into the solution concentrator 26. During this mode of operation of the system valve 47 is open and valve 48 is closed. This arrangement allows the heated fluid heat transfer media drawn from tank 40 to be directed through lines 95, 96, and 98 to heat exchanger 43.

In the heating mode of operation of the system, valve 32 is closed to prevent the flow of the basic hydroxide solution from the reservoir 22 to the vapor exchanger 23. At this time the basic hydroxide solution drawn from the reservoir by pump 28 may be directed via line 73 to the concentrator 26 for exposure to the sun but fan 77 may be turned off to stop the air flow. The solar heated basic hydroxide solution may be returned to the reservoir 22 by pump 29. This heated fluid will pass through heat exchanger 111 to preheat fluid flowing through line 73 to heat exchanger 43. During this mode of operation heat transfer fluid media from tank 40 is passed through the solar heat collector 41 and returned to tank 40 for storage. Heated fluid heat transfer media is drawn from storage tank 40 by pump 46 and directed through lines 95, 97, valve 48, line 101 to coil 102 in heat exchanger 42. Air is passed around element 102 and directed by fan 88 into enclosure 18 for the comfort of the occupants. The fluid heat transfer media from element 102 flows through lines 103 and 98 to heat exchanger 43 from which it flows back to storage tank 40. In the event there is a lack of sufficient solar heat, backup heater 44 may be employed to supply heat to the fluid heat transfer media in line 95 before it is admitted to heat exchanger 42. Supplemental heat may also be supplied by general purpose water heater 107, pump 108 and exchanger 108a in tank 40 assisting in such purpose.

I claim:

1. A method of cooling an enclosure comprising the steps of:

(a) passing water and a basic hydroxide water solution through vapor exchange relation in a region of reduced pressure;

(b) cooling the basic hydroxide water solution after the first step through indirect heat exchange relation with atmospheric air;

(c) passing the water remaining after the first step through heat exchange relation with air;

(d) exposing at least part of the hydroxide water solution after the second step to solar radiation and blowing air thereover at substantially atmospheric pressure to remove water and produce a concentrated basic hydroxide water solution;

(e) returning the concentrated basic hydroxide water solution and some of the water after the third step to the first step; and (f) directing the air used in the third step to the enclosure to be cooled.

2. The method of cooling an enclosure recited in claim 1 in which the water and the basic hydroxide water solution flow in close proximity during the first step.

3. The method of cooling an enclosure recited in claim 1 in which the water and the basic hydroxide water solution flow in close proximity to one another in a multiplicity of shallow repeatedly reversing streams during the first step.

4. The method of cooling an enclosure recited in claim 1 in which some of the basic hydroxide water solution from the second step is recycled to the first step.

5. The method of cooling an enclosure recited in claim 1 in which some of the water from the third step is recycled to the first step.

6. The method of cooling an enclosure recited in claim 1 in which the air directed to the enclosure in the sixth step is recycled.

7. A solar powered air conditioning system comprising:

(a) a first means having a plurality of horizontally spaced columns of vertically spaced trays, alternate columns receiving water, the other columns receiving a basic hydroxide water solution, flow of water and basic hydroxide solution over the trays and down the respective columns serving to vaporize and absorb water into the hydroxide solution;

(b) a second means receiving the hydroxide water solution from predetermined columns of said first means;

(c) a third means receiving the unvaporized water from the other columns of said first means;

(d) a fourth means for exposing part of the basic hydroxide water solution to solar heat to release water and concentrate the hydroxide solution;

(e) a fifth means for collecting the concentrated basic hydroxide solution and returning it to said first means; and (f) a sixth means for directing air over said third means and into an enclosure being air-conditioned.

8. The solar powered air conditioning system of claim 7 in which said fourth means has means for directing part of the hydroxide water solution back to said first means.

9. The solar powered air conditioning system of claim 7 in which means are provided in connection with said second means for indirectly exposing the basic hydroxide water solution to a stream of air.

10. The solar powered air conditioning system of claim 7 in which said sixth means has duct work with a first inlet communicating with the atmosphere and a second inlet communicating with an enclosure being air conditioned, an outlet communicating with the enclosure, said third means being disposed between said second inlet and outlet, and means for causing air flow between said inlets and outlet.

11. The solar powered air conditioning system of claim 7, in which means are provided to direct the hydroxide solution and water to alternate columns.

12. The solar powered air conditioning system of claim 11, in which means are provided to establish communication between the discharge ends of the basic hydroxide water solution receiving columns and said second means.

13. The solar powered air conditioning system of claim 12, in which said second means comprises a heat exchanger structure for passing the hydroxide water solution through indirect heat exchange relationship with an air stream.

14. The solar powered air conditioning system of claim 11, in which means are provided to establish communication between the discharge ends of the water receiving columns and said third means.

15. The solar powered air conditioning system of claim 14, in which said third means comprises a heat exchanger structure for passing the unvaporized water through indirect heat exchange relationship with an air stream.

16. The solar powered air conditioning system of claim 7 in which said fourth means has a trickle down collector wherein the basic hydroxide water solution is exposed to solar rays and means are provided for flowing air at substantially atmospheric pressure thereover to remove water vapor.

17. The solar powered air conditioning system of claim 16, in which said fifth means includes a receiver at one end of the collector.

18. The solar powered air conditioning system of claim 17 in which said fifth means has pump and reservoir means.

19. The solar powered air conditioning system of claim 7 in which additional means are provided to receive and direct a part of the unvaporized water back to said first means.

20. The solar powered air conditioning system of claim 19, in which said additional means comprises pump and passage forming means.

21. The solar powered air conditioning system of claim 20, in which further means are provided to selectively direct part of the unvaporized water from said third means to exhaust and supply supplemental fresh water to said first means.

22. The solar powered air conditioning system of claim 7 in which a seventh means is provided for indirectly exposing the basic hydroxide water solution to a solar heated media prior to admission of such solution to said fourth means.

23. The solar powered air conditioning system of claim 22, in which said seventh means is a substantially conventional solar powered heating system.

24. The solar powered air conditioning system of claim 22, in which said seventh means has a storage tank for a fluid heat transfer media, a solar heat collector, heat exchanger means receiving said fluid media and a portion of the basic hydroxide solution prior to admission thereof to said fourth means.

25. A solar powered air conditioning system comprising:
 (a) a first means for passing water and a basic hydroxide water solution through vapor exchange relation to vaporize and absorb water into the hydroxide solution;
 (b) a second means receiving the hydroxide water solution from said first means;
 (c) a third means receiving the unvaporized water from said first means;
 (d) a fourth means for exposing part of the basic hydroxide water solution to solar heat to vaporize some of the water from such solution and concentrate the hydroxide solution;
 (e) a fifth means for passing a stream of air at atmospheric pressure through said fourth means to remove water vapor therefrom;
 (f) a sixth means for collecting the concentrated basic hydroxide solution and returning it to said first means;
 (g) a seventh means for directing air over said third means and into an enclosure being air-conditioned;
 (h) an eighth means for directing air cooled by water evaporation over said second means to cool the hydroxide water solution received from said first means; and
 (i) a ninth means powered in part by solar energy for preheating some of the concentrated basic hydroxide solution collected by said sixth means before such solution is admitted to said fourth means.

26. The solar powered air conditioning system of claim 25 in which said ninth means includes a substantially conventional solar heating system.

27. The solar powered air conditioning system of claim 26 in which a tenth means is provided for passing air moved by said seventh means into heat exchange relation with a solution from the conventional solar heating system of said ninth means prior to admission of such air into the enclosure.

28. The solar powered air conditioning system of claim 27 in which an eleventh means is provided for selectively directing a solution from the conventional solar heating system to the preheating means of said ninth means or the heat exchanger of said tenth means.

* * * * *